73-632 SR

XR 2,779,191

Jan. 29, 1957 G. W. WILLARD 2,779,191

FREQUENCY DISCRIMINATOR EMPLOYING MULTIPLY RESONANT PIEZOELECTRIC VIBRATOR

Filed Oct. 28, 1950 6 Sheets-Sheet 1

INVENTOR
G. W. WILLARD
BY Franklin Mohr
ATTORNEY

Jan. 29, 1957 G. W. WILLARD 2,779,191
FREQUENCY DISCRIMINATOR EMPLOYING MULTIPLY
RESONANT PIEZOELECTRIC VIBRATOR
Filed Oct. 28, 1950 6 Sheets-Sheet 2

FUNDAMENTAL

THIRD HARMONIC

INVENTOR
G. W. WILLARD
BY Franklin Mohr
ATTORNEY

Jan. 29, 1957

G. W. WILLARD 2,779,191

FREQUENCY DISCRIMINATOR EMPLOYING MULTIPLY RESONANT PIEZOELECTRIC VIBRATOR

Filed Oct. 28, 1950

6 Sheets-Sheet 3

FIFTH HARMONIC

INVENTOR
G. W. WILLARD
BY Franklin Mohr
ATTORNEY

INVENTOR
G. W. WILLARD
BY Franklin Mohr
ATTORNEY

INVENTOR
G. W. WILLARD
BY Franklin Mohr
ATTORNEY

FREQUENCY DISCRIMINATOR EMPLOYING MULTIPLY RESONANT PIEZOELECTRIC VIBRATOR

Filed Oct. 28, 1950 6 Sheets-Sheet 6

INVENTOR
G. W. WILLARD
BY Franklin Mohr
ATTORNEY 2,779,191

FREQUENCY DISCRIMINATOR EMPLOYING MULTIPLY RESONANT PIEZOELECTRIC VIBRATOR

Gerald W. Willard, Fanwood, N. J., assignor to Bell Telephone Laboratories, Incorporated, New York, N. Y., a corporation of New York Application October 28, 1950, Serial No. 192,765

9 Claims. (Cl. 73—67.8)

In my copending application Serial No. 17,272, filed March 26, 1948, now United States Patent No. 2,549,872, issued April 24, 1951, assigned to the same assignee as the present application, I have described curved piezoelectric radiators of uniform thickness which vary in resonant frequency from point to point over their surface due to the fact that the curved radiator has a frequency constant which varies over the surface, and this in turn is due to the variation in the orientation of the radiating surface with respect to the crystallographic axes of the radiator.

A somewhat similar variation in resonant frequency is obtainable in a wedge of piezoelectric material by virtue of the varying thickness, although the orientation of the radiating surface and hence the frequency constant of the radiator may be the same in all portion of the radiator.

In accordance with the invention, a radiator of variable resonant frequency is located in contact with a suitable vibration transmitting medium and is provided with operating electrodes arranged to impress an electric potential variation over substantially the whole radiative surface of the radiator. Any region of the radiative surface which is resonant to the impressed potential variations or to any frequency component of a complex impressed potential variation is excited thereby into localized vibrations which may result in a beam or beams of vibrational waves being radiated into the contiguous medium. The radiated beams of vibrational waves impinge upon a plurality of elastic transmission members disposed in contact with the transmitting medium and excite those members which are resonant to the radiated vibrational waves. Resonant condition responsive devices coupled to the resonant members indicate such factors as the particular frequencies in the complex impressed potential variation, the velocity of the radiated beams through certain transmission media, or the dimensional properties of a particular resonant elastic transmission member.

Figures 1, 28:
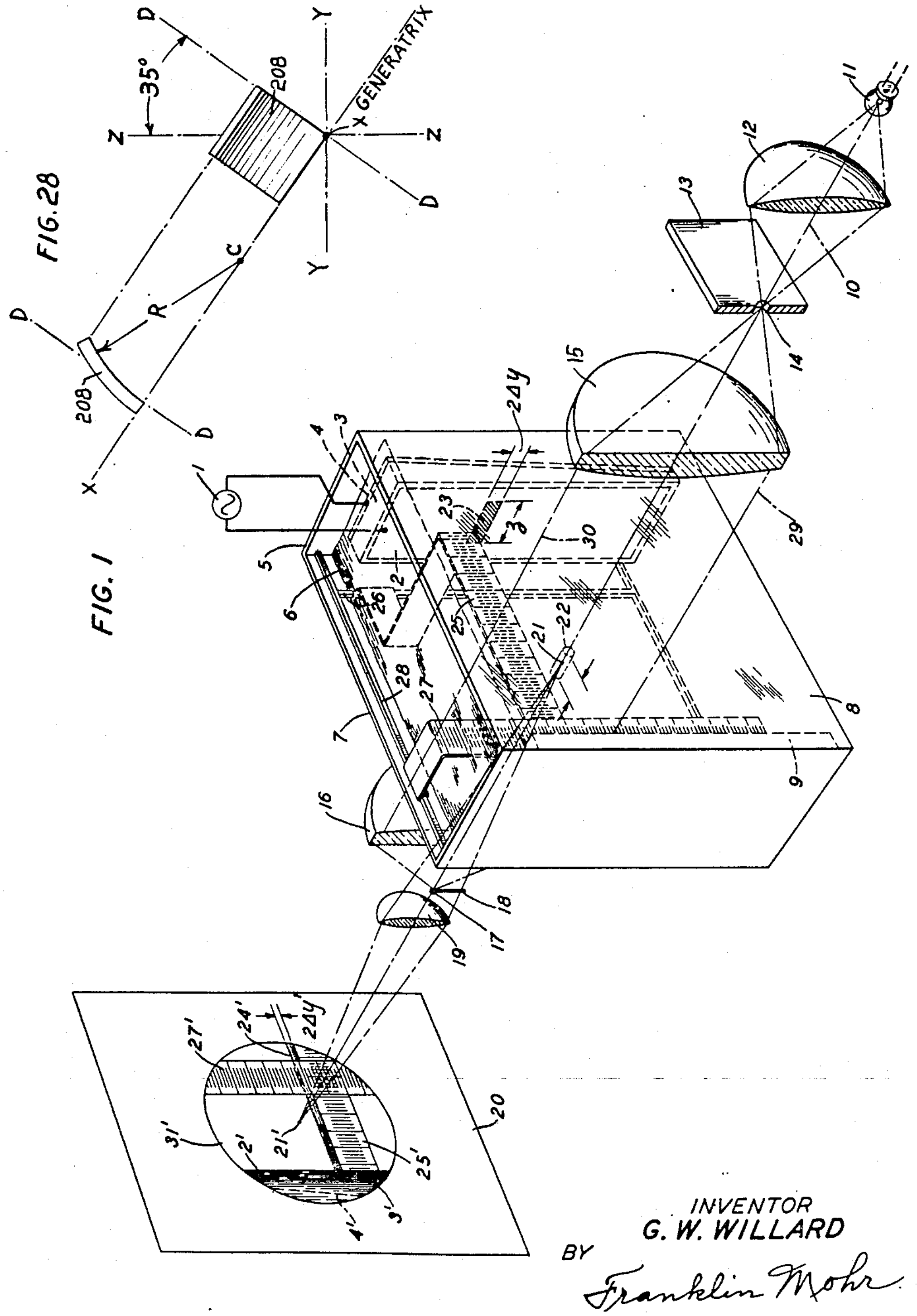
Fig. 1 is an isometric view of the mechanical and optical parts of an arrangement for measuring the frequency of an oscillating electric signal.
Figure 8:
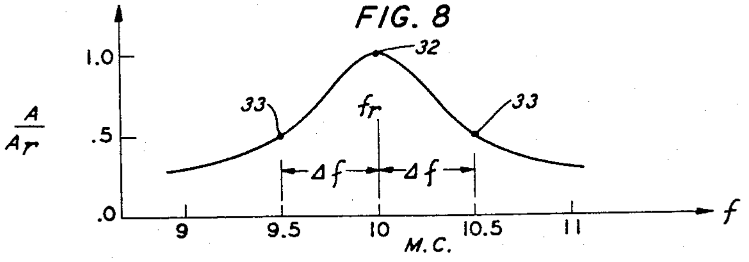
Figure 9:
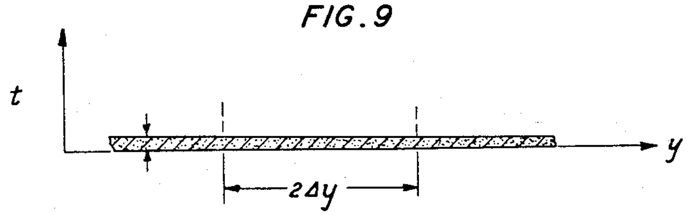
Figure 10:
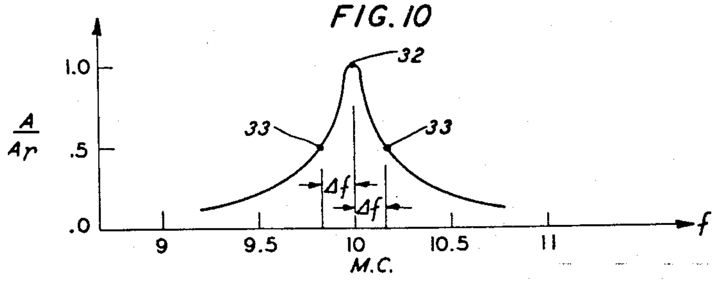
Figure 11:
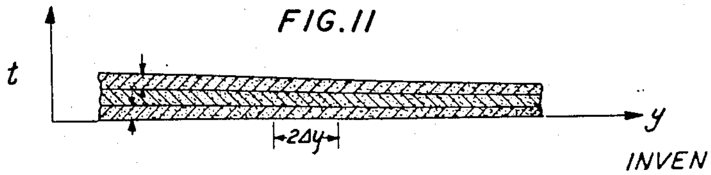
Figure 12:
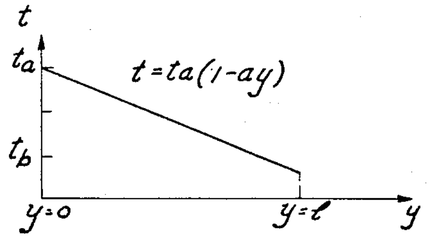
Figure 13:
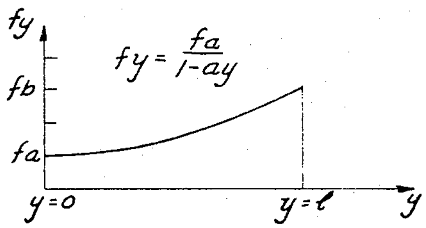
Figure 14:
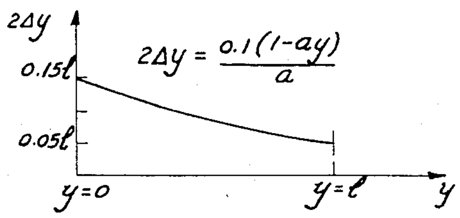
Figure 20:
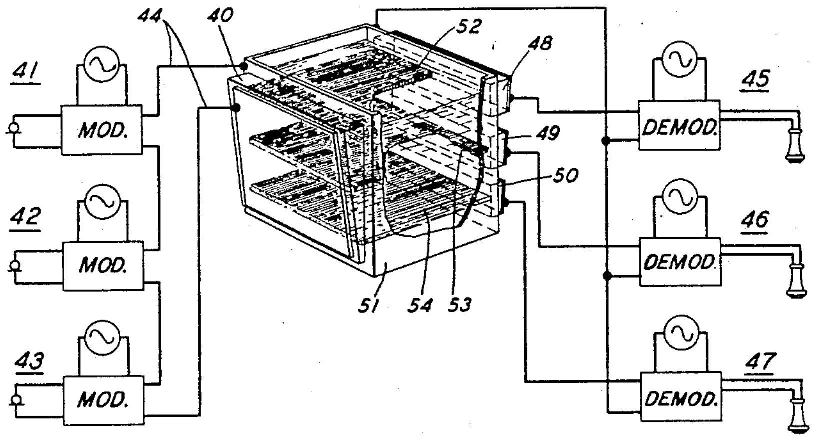
Figure 21:
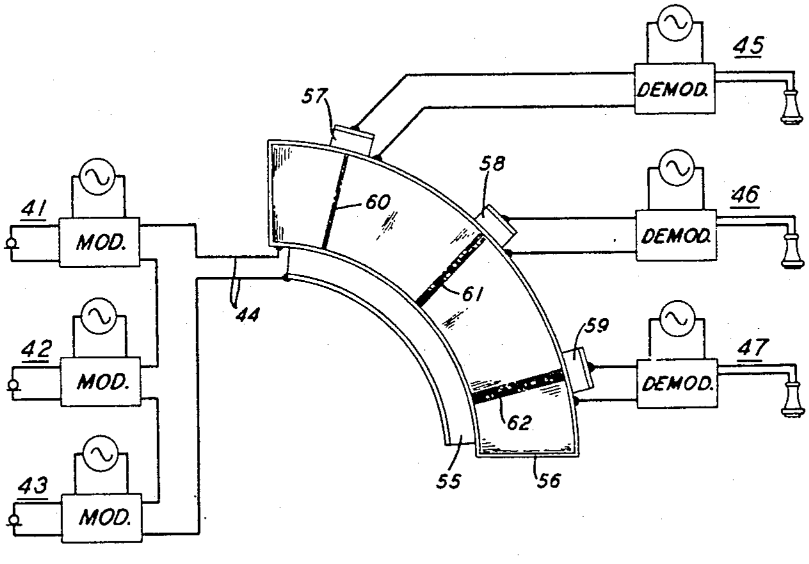
Figure 22:
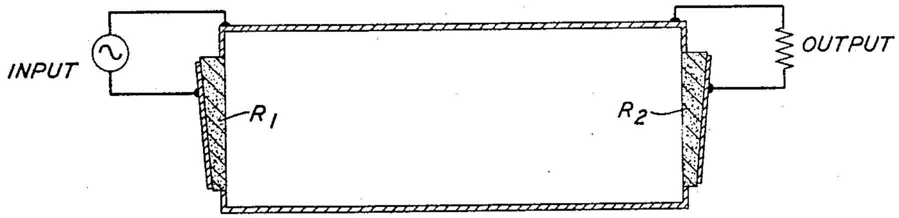
Figure 23:
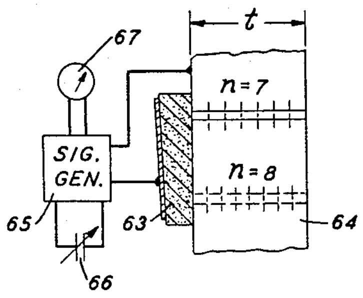
Figure 24:
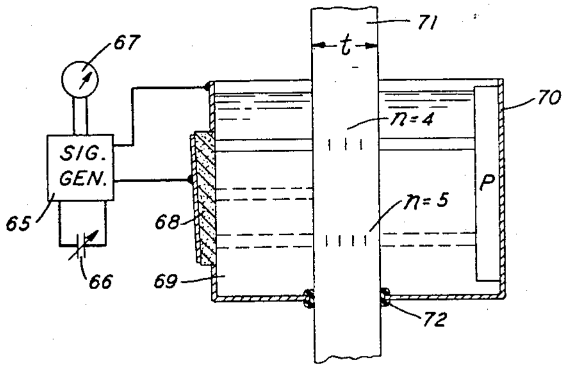
Figure 25:
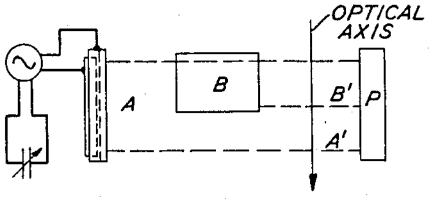
Figure 26:
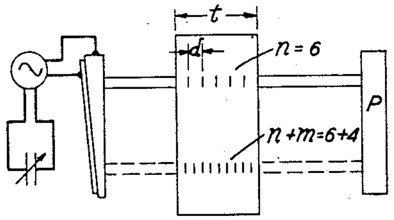
Figure 27:
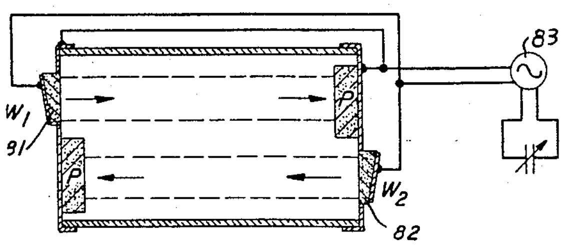

Figs. 4, 5, 6, and 7 are screen patterns such as may be obtained with the arrangement of Fig. 1 under different conditions;

Figs. 8 and 9 are diagrams useful in explaining the operation of a wedge radiator at fundamental frequency;

Figs. 10 and 11 are diagrams useful in explaining the operation of a wedge radiator at third harmonic frequency;

Figs. 12, 13, and 14 are diagrams used in explaining the interrelation of the thickness, frequency, and beam width functions of a radiator;

Figs. 15, 16, 17, 18, and 19 show means of overcoming extraneous modes of vibration in a wedge radiator;

Figs. 20 and 21 show three-channel voice systems in which an arrangement according to the invention is used as a channel filter;

Fig. 22 is a schematic diagram of an ultrasonic delay line employing the wedge radiators;

Figs. 23 and 24 are schematic diagrams showing applications of the invention to measurements of thickness or other properties of sheet materials;

Figs. 25 and 26 are top and side view schematic diagrams, respectively, of an application of the invention to a velocity measuring system;

Fig. 27 is a schematic diagram of a broad frequency band light modulator embodying the invention; and Fig. 28 is an orientation diagram for a specifically oriented cylindrical quartz vibrator for use as a channel filter.

Fig. 1 shows the arrangement of the acoustic and optical parts of an equipment for measuring the frequency of an oscillating electrical signal. The electric signal whose frequency it is desired to know is supplied by a generator 1 which is connected to the electrodes 2 and 4 of a piezoelectric transducer 3. The transducer 3 has the form of a thin wedge with rectangular edge boundary and may be made of X-cut quartz, for example, in which case the X-crystallographic axis thereof should be in the direction of the thickness of the wedge, that is, approximately normal to the electrode faces 2 and 4. As here shown, the taper of the wedge 3 is from thick at the top to thin at the bottom, the exact nature of the taper being described later. As described under succeeding figures, the transducer assembly 2, 3, 4 closes the end of a tank 5 so that the latter may contain an acoustic transmitting liquid 6. The tank has two parallel major faces 7 and 8 made of optical glass plates so that light may be passed undeviated through them. In the far end of the tank, an acoustic absorbing pad 9 is placed to absorb without reflection all sound waves incident thereon and hence to prevent any standing wave patterns being formed. The liquid medium 6 may be any of a number of acoustically and optically transmitting mediums, for example, water. The pad 9 may be one of the synthetic rubbers which is sufficiently attenuating and whose acoustic impedance (density times velocity) matches that of the liquid medium 6. The tank 5 and its contents will hereinafter be called the sonic unit.

The optical system comprises a number of elements arranged along the optical axis 10, said axis being fixed perpendicularly to the windows 7, 8 and parallel to the radiator electrode surfaces of elements 2, 3 of the sonic unit 5. A source 11 sends light through a condenser lens 12 and through a pinhole 14 in an aperture plate 13. In many cases, the pinhole 14 may be replaced by a long narrow rectangle with its length in the vertical direction, parallel to the radiator 2, 3, 4, and its width equal to the diameter of the pinhole as hereinafter described. This, together with a similarly elongated light source, gives increased illumination. A lens 15 collimates the light from the pinhole 14 through the sonic unit where a focusing lens 16 refocuses the light onto an opaque pinhead aperture 17 mounted on a slender support 18. Alternatively, 17 may be an opaque disk on a transparent plate. The diameter of the pinhead 17 is equal to or slightly larger than the image of the pinhole falling upon it, thus stopping all light passage when no sound waves are present in the sonic unit. If the pinhole 14 is replaced by a rectangular hole, the pinhead 17 is to be replaced by an opaque rectangle. Further, the pinhead aperture 17 may be replaced by a pinhole aperture of the same shape as the pinhole aperture 14. These details and their effect are well known. The diameter *d* of the pinhole 14 is well known to be determined from the focal length F of the lens 15, the shortest wavelength of light used $\lambda_L$, and the longest wavelength of sound to be used $\lambda_S$ by $$d=\beta F=(\lambda_L/\lambda_S)F \qquad (1)$$

as shown, for example, in the following published references:

(1) G. W. Willard, United States Patents Nos. 2,345,441 and 2,287,587.

(2) G. W. Willard, J. A. S. A., 21 (101–108), March 1949.

(3) L. Bergman-H. S. Hatfield, Ultrasonics (John Wiley and Sons, Incorporated, New York, 1939).

When sound waves are passing through the sonic unit 5, some of the light normally striking the pinhead 17 will be diffracted and pass by the pinhead through a projecting lens 19 and onto a screen 20 so that a point such as 21 in the center plane of the sonic unit 5 is imaged at the point 21' on the screen 20. Similarly, the electrode face 2 of the radiator 3 is imaged as 2', and transparent scales 25 and 27, to be described, are imaged as 25' and 27'. Thus, the whole view on the screen 20 is a reversed image of the central object plane of the sonic unit 5, the boundary 31' corresponding to the illuminated area in 5, two of whose limiting light rays are 29 and 30. When a sound beam 24 (not shown in this view) is radiated from an area 23, for example, of the radiators 2, 3, 4, it will traverse the tank to the pad 9 and will be imaged on the screen as a bright band 24', the height $2\Delta y'$ of 24' being equal to the height $2\Delta y$ of 23 multiplied by the optical magnification, which is given by the ratio of the distances 19 to 21' and 19 to 21. Transparent scales 25 and 27, slidingly mounted on supports 26 and 28, are used to measure the length or the height, respectively, of the radiated sound beam.

Figure 2:
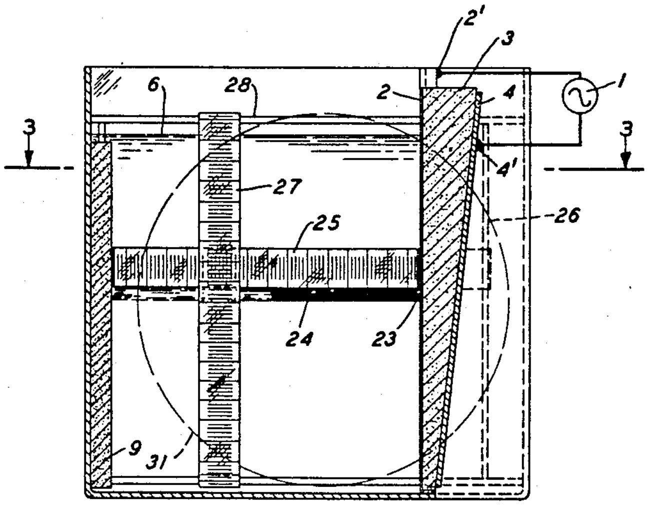
Fig. 2 is a side view of the arrangement of Fig. 1, omitting optical parts but indicating a radiated sound beam.
Figure 3:
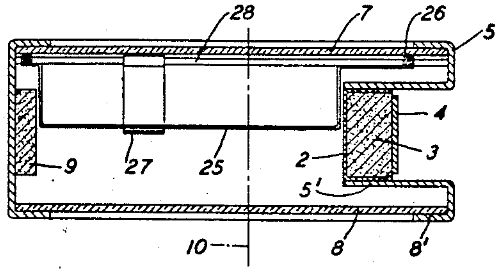
Fig. 3 is a top view of the arrangement of Fig. 1, omitting optical parts.

Fig. 2 shows a side view and Fig. 3 shows a top view, sectional at 3—3 of Fig. 2, of the sonic unit 5 of Fig. 1. The scales 25 and 27, mounted on supports 26 and 28, respectively, are shown in this figure positioned near to the sound beam 24 radiated from the area 23 of wedge radiator 2, 3, 4. The circle 31 encloses the illuminated area of the sonic unit 5 and is imaged on the screen 20 of Fig. 1, and Figs. 4, 5, 6, 7, as 31'. The optical object plane in the tank is normal to the optical axis, 10, parallel to the windows 7 and 8, and lies mid-way between 7 and 8. The quartz wedge 3 is metallized, as by evaporation, on the inner major face and the edges to form the electrode 2 and to provide means of soldering around the edges to reentrant rectangular sleeve 5'. Thus, electrode 2 is electrically continuous with the metal parts of the tank 5 and may be electrically connected to the signal source 1 at any point of the tank, as at 2'. The outer electrode 4 may be also metallized and connected as by soldering at 4', or 4 may be a flat stiff metal plate lightly sprung against 3. In any case, electrode 4 is appreciably smaller than the face of the wedge 3 to provide electrical insulation from 2. Preferably, 4 is sufficiently smaller than the face of 3 that the electric field between the two faces of 3 is unaffected by edge metallization of the wedge. Thus, no mechanical vibration will occur in the wedge around its periphery where it is attached to the sleeve 5'. The windows 7, 8 of optical plate glass may be cemented into the tank 5 or may be metallized on the edges and soldered in place. In the latter case, the sonic unit 5 is suitable to contain any non-corrosive liquid that it may be desired to use and, if electroplated after assembly with the proper metal, could be used for many corrosive liquids.

Figs. 4, 5, 6, and 7 are screen patterns like that shown on the screen 20 of Fig. 1, each for a different condition of operation. It is to be recalled that these images are optically reversed from the array in the object plane of the sonic unit, as will be seen by comparing the primed designations of the image with their un-primed designations in the object plane of the sonic unit of Figs. 1, 2, 3.

Figure 4:
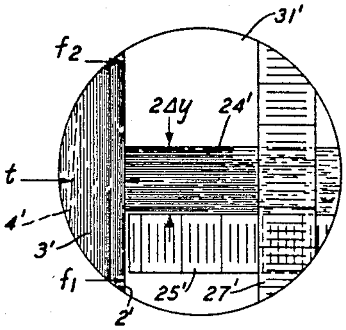

It will be convenient in describing Figs. 4, 5, 6, and 7 to refer to the images as though they were the actual objects in the sonic unit 5. Thus, 3' may be called the radiator, and its thickness as later used will be *t*, and the height of the sound beam 24' will be hereinafter called $2\Delta y$, as shown in Fig. 4.

When using the assumed pinhole 14 and pinhead 17 apertures and when no signal is applied to the radiator 2, 3, 4, the image will be mainly relatively dark, being illuminated only by scattered light passing the pinhead 17. The region from 2' to 31' will be entirely black, since the radiator 2, 3, 4 and its mounting entirely cut off the light . The scale images 25' and 27' may be quite bright if the scales 25 and 27 are properly made, say by opaquely coating a transparent plastic and then engraving the markings through the opaque coating. When a sound beam is present in the sonic unit, it will be imaged by the bright band 24' in an otherwise dark field, although in the figures, 24' is shown for convenience as dark in a bright field.

A negative of this image would be obtained if the aperture pinhead 17 were replaced by a pinhole, as at 13, 14, as previously explained. This latter arrangement is usually not preferred, since the picture definition is reduced due to the smallness of the bundle of rays which then pass through the plane of 17 to form the image.

Fig. 4 shows the screen pattern when the wedge radiator 3' is operated in its fundamental mode, the applied signal having a frequency *f* for which the radiator thickness *t*, at the location corresponding to the center of the beam 24', is resonant. For example, assuming that the frequency constant of the radiator is $K=2860$ kc.-mm., then *f* in kilocycles is given by $$f=2860/t \qquad (2)$$

where *t* is in millimeters. Thus, at the particular location along the wedge labled as *t* in the figure, the radiator will be excited at resonance, and a maximum of sonic energy will be radiated into the liquid. At other locations along the radiator, receding from this location the wedge, though excited electrically over its whole vertical height, the radiator will be excited increasingly off resonance and hence will radiate decreasing intensities of sonic energy into the liquid. Thus, the beam 24' will be most intense at its center, and the intensity will decrease on each side of center on receding therefrom. Though the beam 24' is indicated to have sharp boundaries separated by the distance $2\Delta y$, actually there are no sharp boundaries observed, the intensity grading off gradually. However, as explained later, the width $2\Delta y$ is definitely related to the intensity distribution by being the width of the beam between the points where its intensity has dropped to one-half value. This definition of the beam width is as useful in later comparisons as though the beam had definite boundaries.

It is evident from Fig. 4 that the width of sound beam is decreased if the degree of taper of the wedge radiator is increased. For the radiator 3' shown here with plane faces 2' and 4', the degree of taper may be doubled by doubling the angle between the faces 2' and 4', and this will result in decreasing the beam width $2\Delta y$ to one half its previous value. At the same time the range of frequencies, from a minimum value $f_1$ at the thick end to a maximum of $f_2$ at the thin end, will increase to double with the doubling of the taper angle.

If either the degree of taper or the length of taper or both are increased to or beyond the amount where the thick end is equal to or greater than three times the thickness of the thin end, then $f_2 \geqq 3f_1$, and an ambiguity may result from the fact that the radiator may radiate in two places at once. This is true, since for any given thickness of radiator $t_a$, the radiator may vibrate in any odd harmonic of the fundamental frequency $f_a$ such that $f=nf_a$, where $n$ is odd. Use of this harmonic operation will be referred to in the following sections of this specification. In the present case, it is, however, assumed that the frequency range is limited by restriction to $f_2$ less than $3f_1$. Thus, for a signal whose frequency is varied between $f_2$ and $f_1$, the radiated sound beam will slide up and down in the field, always being radiated from the location where the thickness $t$ is correct to obtain resonance at the instantaneous value of the frequency. Hence, a properly calibrated scale 27' may be used to determine the frequency of signal that is applied to the radiator, the center of the sound beam 24' being used as the index point. If the applied signal has components of three frequencies $f_i$, $f_j$, $f_k$ within the range $f_1$ to $f_2$, then three individual beams will be radiated; and, providing their separations are not too close, each frequency may be determined.

Let it be summarized that for fundamental operation, as in Fig. 4, the range of frequencies that may be determined is from $f_1$ to $3f_1$. This operation is most useful where the required range of frequency is large. As the range is restricted, the width of sound beam $2\Delta y$ is increased until the point where it appears to cover the whole field of view, its center cannot be determined, and thence the applied frequency is undetermined.

Figure 5:
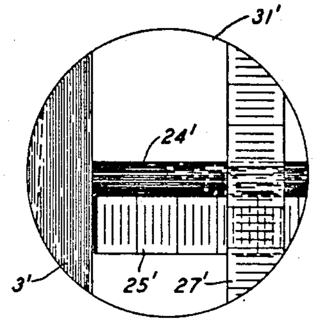

Fig. 5 shows the screen pattern when the radiator is operated in the third harmonic mode so that $$f=3K/t \qquad (3)$$

The sound beam $2\Delta y$ is now reduced to one third the value that would prevail were the same radiator operated in the fundamental mode, as will be explained hereinafter. However, to prevent the ambiguity resulting from radiation of two sound beams for a single signal frequency, the range must now be restricted to between $f_1$ and $(5/3)f_1$, which may be accomplished by keeping the thick end of the radiator less than 5/3 as thick as the thin end. It is seen then that the third harmonic operation of the radiator provides greater sensitivity in measuring frequency, since $2\Delta y$ is reduced, but over a narrower range of frequencies than was possible with fundamental operation. It might be parenthetically noted that this same radiator designed to be operated over the range of frequencies $f_1$ to $(5/3)f_1$ in third harmonic may also be operated in the fundamental mode merely by applying frequencies within the range $(1/3)f_1$ to $(5/9)f_1$. However, as noted before, the width of sound beam 24' will then be three times as great as when properly used in the third harmonic mode, and sensitivity will be reduced.

Figure 6:
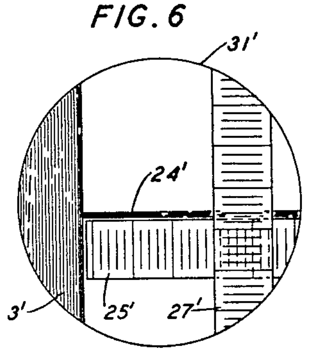

Fig. 6 shows the screen pattern when the radiator is operated in the fifth harmonic mode so that $$f=5K/t \qquad (4)$$

Here, the sound beam width is reduced to one fifth that prevailing when the same radiator is operated in the fundamental mode. The unambiguous frequency range is now reduced to the range from $f_1$ to $(7/5)f_1$, which restriction is accomplished by making $t_1$ less than $(5/7)$ $t_2$. Thus, as the order of harmonic is increased, the range is decreased but the sensitivity is increased.

Figure 7:
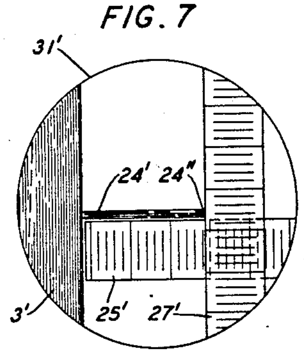

Fig. 7 shows the screen pattern when the radiator is operated in any mode, use being made of both scales 25' and 27', the latter being used as previously described in Fig. 4 to indicate the frequency of the applied signal, the location of the sound beam 24' along the suitably calibrated scale 27' determining the frequency. The scale 25', on the other hand, may be used to indicate the relative intensity of the applied electric signal. In this case, the liquid transmitting medium is chosen to have a suitable attenuation so that the strongest signal received will produce an apparent length of beam 24' which just crosses the field of view. Then, weaker signals will have shorter (horizontal in Fig. 7) lengths whose end position 24'' is measured on the scale 25'. Thus, with a suitably calibrated scale, the strength of the signal, as well as the frequency, may be determined. The choice of a suitable liquid may be easily made by consulting the literature, e. g., G. W. Willard, "Ultrasonic Absorption and Velocity Measurements in Numerous Liquids," J. A. S. A., vol. 12, No. 3, 438–448, January 1921. Liquids of intermediate attenuations may be obtained by mixing, as in United States Patent No. 2,407,294, William Shockley and G. W. Willard.

Figs. 8 and 9 are used to exxplain the operation of a wedge radiator operated in its fundamental mode of thickness vibration. Fig. 9 shows a portion of a wedge whose thickness $t$ varies with distance $y$ along the wedge. When the radiator is made of piezoelectric quartz, the $t$-direction may be parallel to the crystallographic X-axis of the quartz, while the $y$-direction may be some crystallographic direction normal to the X-axis. Electrodes are assumed adjacent to the major surfaces of the wedge material, i. e., the surfaces approximately perpendicular to the $t$-axis. In Fig. 8 is shown, along the $f$-axis, a possible distribution of resonant frequencies along the wedge, calculated from the formula $$f=K/t \qquad (5)$$

The curve shows the relative radiated sound amplitudes in the adjoining sound transmitting medium when the radiator is driven at the frequency 10 megacycles. For the point 32, the thickness of the radiator is exactly correct for the radiator to be in resonance at 10 megacycles. The amplitude of the sound beam at this point is taken as $A_r$, subscript $r$ indicating the resonant condition. For any other location, the amplitude will be less, for at other locations the radiator is being excited off resonance. Thus $A/A_r$ is the ratio of the amplitude A at any location relative to $A_r$ at the resonant location. It is well known that $A/A_r$ varies with frequency, for a normal plane parallel radiator, according to $$A/A_r=1/\Omega^{1/2} \qquad (6)$$

where $\Omega$ is a function of the ratio of the driving frequency to the resonant frequency, as shown in my above-identified Patent No. 2,549,872, and in my article in Journal of Acoustical Society of America, 21, pages 360–375, July 1949. The two points 33 on the curve indicate that at the locations where the natural resonant frequency is 9.5 and 10.5 megacycles, respectively, the sound amplitude is reduced to one half that occurring at the 10-megacycle location, a condition about correct for X-cut quartz radiating into water on one side only. The frequency separation between these two points is $2\Delta f$ and corresponds to a location separation of $2\Delta y$. The amplitude of the sound beam falls off rapidly outside the region between the points 33, soon becoming ineffective for any purpose. While the width of the sound beam in the $y$-axis direction has no definite value, its effective width is limited. Since the effective width varies with the degree of taper of the wedge, the thickness of the wedge and the material of the wedge and of the medium into which it radiates, and the mode of operation, it is useful to define an arbitrary numerical width for the beam which then may be related to the quantities affecting the spread. For this purpose, the width of the beam is defined to be the distance $2\Delta y$ between the points 33, where the amplitude ratio $A/A_r$ just falls to one-half value. At each of these points, the driving frequency is designated as $\Delta f$ different from the resonant frequencies for these points.

Figs. 10 and 11 explain the operation of a wedge radiator operated in its third harmonic mode. The frequency range used here is chosen to be the same as that used in Figs. 8 and 9, so that here the radiator must be three times as thick as in Figs. 8 and 9. The explanation of Figs. 8 and 9 applies also to Figs. 10 and 11, except that in the latter case the points 33 for half amplitude $A/A_r=\frac{1}{2}$ occur for $\Delta f$, and $\Delta y$ having values one third that previously found, as will be shown hereinafter. Thus, a third-harmonic radiator will radiate a sound beam only one third as wide as a fundamental radiator of the same frequency range. The optical effects resulting from such wedges mounted as in Figs. 1, 2, 3, is shown in Fig. 4 for fundamental operation (as explained in Figs. 8 and 9), Fig. 5 for third harmonic operation (as explained in Figs. 10 and 11), and Fig. 6 for fifth harmonic operation. Thus, where frequency discrimination is desired, it is preferable to use harmonic operation of the radiator. It is well known that any thickness mode radiator may be operated at any of its odd harmonics as well as its fundamental mode, N denoting the order and being 1, 3, 5, . . . in the frequency determining equation $$f=NK/t \qquad (7)$$

where K is a constant of the material and $t$ the thickness.

Figs. 12, 13, and 14 are used to explain the mathematical relation between thickness $t$, frequency $f$, and beam width $2\Delta y$ for a wedge radiator.

In Fig. 12, the wedge shape cross section of the radiator is shown in the $(y, t)$ coordinate plane, the length of the radiator in the $y$-direction being $l$, and the length in the $z$-direction normal to the figure being designated as $z$. Strictly speaking, the major dimensions $l$ and $z$ are of the electrode area of the radiator only since in general, as previously pointed out, the electrodes do not go to the edges of the radiator. In the present case, Fig. 12, the thickness $t$ varies with location $g$ according to $$t=t_a(1-ay) \qquad (8)$$

where $t=t_a$ at $y=0$, the thick end; and $t=t_b=t_a(1-al)$ at the thin end, $a$ being a constant. If it is desired to use this wedge in fundamental operation, $t_b$ should not be less than one third as large as $t_a$ to avoid double radiation and ambiguity, as previously described. Suppose, as shown in the figure, $t_b=t_a/3$, then it can be derived that $$a=\frac{2}{3l}$$

whence $$t=t_a\left(1-\frac{2y}{3l}\right) \qquad (9)$$

Fig. 13 shows the resonant frequency of the wedge as a function of location $y$ along the wedge. If $f_a=K/t_a$, where K is the frequency constant of the material, then $f_a$ is the fundamental resonant frequency of the wedge at the thick end $y$=zero, and at any other location, the fundamental resonant frequency is $$f_y=f_a/(1-ay)=f_a/(1-2y/3l) \qquad (10)$$

and varies increasingly from $f_a$ to $3f_a$. In third harmonic operation, not shown, $$_{III}f_y=3f_a/(1-ay)=3f_a/(1-2y/3l) \qquad (11)$$

and varies from $3f_a$ to $9f_a$, where in either case $f_a=Kt_a$. It is to be noted that when the radiator has a linear taper, as in Fig. 12, both major faces plane, then the frequency does not vary linearly with location $y$.

Fig. 14 shows how the sound beam width $2\Delta y$ will vary with location $y$. From the frequency Equation 10, it can be found that $$\Delta f=\frac{af_a\Delta y}{(1-ay)^2}=\frac{af_y\Delta y}{1-ay} \qquad (12)$$

Solving (12) for the band width, $$2\Delta y=\frac{2(1-ay)}{a}\frac{\Delta f}{f_y} \qquad (13)$$

Now, from the definition of $\Delta f$, the ratio $\Delta f/f_y$ must have the specific value that will make $A/A_r=1/2$, as previously described. It is known that $$A/A_r=R_r/R=1/\Omega^{\frac{1}{2}} \qquad (14)$$

where $R_r$ and $R$ are the radiation resistance at resonance and off-resonance, respectively, and $$\Omega \doteq 1+4M^2C^2 \qquad (15)$$

where M is $(\rho v)_R/(\rho v)_M$, the ratio of acoustic impedances of the radiator material and the sound transmitting medium, respectively, and $$C^2=\cot^2\left(\frac{\Delta f}{2f_r}\right)=\tan^2\left(\pm\frac{\pi\Delta f}{2f_r}\right) \qquad (16)$$

where $\Delta f/f_r$ may be taken as $\Delta f/f_y$ in our present case, as may be seen by reference to my article in Journal of Acoustical Society of America, July 1949, cited. It is evident that at the edge of the band $$A/A_r=1/2=1/(1+4M^2C^2)^{1/2} \qquad (17)$$

from which it follows that $$C^2=\frac{3}{4M^2} \qquad (18)$$

For an X-cut quartz wedge radiating into water, M is approximately ten, whence $$C \doteq 0.08 \qquad (19)$$

and $$\pm\frac{\Delta f}{f_r}\doteq 0.05 \qquad (20)$$

Hence, $$2\Delta y \doteq \frac{2(1-ay)}{a}(0.05)$$

$$=\frac{(0.1)(1-ay)}{a}$$

$$=0.15l\left(1-\frac{2y}{3l}\right) \qquad (21)$$

That is, the sound beam width is a function of location along the radiator (or of frequency at which it is excited) and varies from $0.15l$ at $y=0$ to $0.05l$ at $y=l$.

If in Fig. 12, the wedge had been chosen three times as thick, so that $$t_y'=t_a'(1-ay)=3t_a(1-ay) \qquad (22)$$

varying from $3t_a$ to $t_a$, and if operated in the third harmonic, it would have the frequency relation $$_{III}f_y=3f_a'/(1-ay)=f_a(1-ay) \qquad (23)$$

which is the same frequency relation as shown in Fig. 13, since $$3f_a'=3K/t_a'=K/t_a \qquad (24)$$

On the other hand, the sound beam width $2\Delta y$ will be different, since in the relation for $\Omega$, $f_r$ is the fundamental resonant frequency. Thus, $$\Delta f/f_r=\Delta f/(_{III}f_y/3) \qquad (25)$$

or, since $$2\Delta y=\frac{2(1-ay)\Delta f}{a\,_{III}f_y}$$

$$=\frac{2(1-ay)\Delta f}{3af_r}$$

$$=0.05l\left(1-\frac{2y}{3l}\right) \qquad (26)$$

which is one third the value found for Fig. 14.

For some applications, it is desirable to shape the taper in such a manner that the frequency scale will be linear or that it will vary in some specified manner with $y$. Or it may be desired that the sound beam width $2\Delta y$ be independent of $y$ or have some desired relation to $y$. These requirements may be met by suitable choice of the taper function. For this purpose, let us define $\phi(y)$ as a function of $y$ which varies continuously and increasingly from $\phi(0)=1$ at $y=0$ to $\phi(l)=k$ at $y=l$. Then, $$Nf_y=Nf_a\phi(y) \qquad (27)$$

will give the $n$th order harmonic frequency as a function of $y$, which will vary from $N \cdot f_a$ at $y=0$ to $k \cdot Nf_a$ at $y=l$, N having odd positive values and $f_a$ being the fundamental resonant frequency at $y=0$. Then, since $f_a=K/t_a$, $t_y=t_a/\phi(y)$, it can also be shown that $$(2\Delta y)=(2b/N)(\phi(y)/\phi'(y)) \quad (28)$$

where $b=\Delta f/f_r$ has the proper value as obtained from $$b=\Delta f/f_r=\tan^{-1}\sqrt{3\pi/M^2} \quad (29)$$

for the particular radiator and sound medium materials used, and $\phi'(y)=(d/dy)\phi(y)$.

Further, it may be desired to have the radiated sound power vary in some specified manner with location $y$. The radiated sound power is given by $W=V^2A/R_r$, where V is the applied voltage, $R_r$ is the radiation resistance per unit area, and $A=(2\Delta y)z$ is the area of the radiation region. It is known from the July 1949 article that $R_r=(\text{const})/f_r^2$, $f_r$ being the fundamental resonant frequency $Nf_y/N$. Hence, $W \alpha V^2(2\Delta y)\cdot(Nf_y/N)^2$, or $$W=kV^2\phi^3(y)/N^3\phi'(y) \quad (30)$$

In other cases, it may be desired that the optical effect $L_c$ for light passing in the $y$-direction of the wedge remain constant. Now $L_c$ will be constant if the product of sound amplitude $(W/A)^{1/2}$ and beam width $(2\Delta y)$, i. e., $(W/A)^{1/2}\cdot 2\Delta y=L_c=\text{const}$. Now, $$(W/A)^{1/2}=V/R^{1/2}\alpha V\cdot f_r$$

hence $$L_c=kVf_r(2\Delta y)=kV\phi^2(y)/N^2\phi'(y) \quad (31)$$

Table I lists a number of examples of frequency functions $\phi(y)$, and lists for each the corresponding $f_y$, $t_y$, $2\Delta y$, W, and $L_c$ functions. Case I is a perfectly general case, and Case II is a general power function case. Cases IIA, IIB, IIC, and IID are special cases of Case II.

Case IIA has special merit for measuring frequencies, in that the frequency scale $f$ is linear with location $y$.

Case IIC has special merit for delay lines, since the radiated sound power is independent of frequency $f$ and location $y$.

Case IID has special merit for broad-band light valving where it is desired that light transmisison function $L_c$ be independent of location $y$ and frequency $f$. In this case, the $y$-axis of the radiator is made parallel to the optic axis of the optical system.

Case III has special merit for applications where it is desired that the radiated sound beam have a width which is independent of location and frequency.

For other applications, it may be desired that driving voltage required to obtain a given power output W be proportional to $1/f^2$. This condition is obtained in Case IIB.

It is thus seen from the examples cited that the general equations of Case I may be used to work back from some specific requirement on $2\Delta y$, W, $L_c$, or V to determine the necessary $\phi(y)$ function and hence the required taper, $t=t_a\phi(y)$.

*Table I examples of $\phi$ functions (here $f={}_Nf_y$ as used in the text)*

I—General $\phi$ function: $\phi=\phi(y)$; $\phi'=(d/dy)\phi(y)$:
- $f=Nf_a\phi$, $t=t_a\phi^{-1}$, $t_af_a=K$=fundamental frequency constant of radiator
- $2\Delta y=(2b/N)\phi(\phi')^{-1}$
- $W=(kV^2/N^3)\phi^3(\phi')^{-1}$
- $L_c=(kV/N^2)\phi^2(\phi')^{-1}$ II—$\phi$=power function: $\phi=(1+ay)^n$; $\phi'=na(1+ay)^{n-1}$
- $f=Nf_a(1+ay)^n$ $t=t_a(1+ay)^{-n}$
- $2\Delta y=(2b/Nan)(1+ay)$
- $W=(kV^2/N^3an)(1+ay)^{2n+1}$
- $L_c=(kV/N^2an)(1+ay)^{n+1}$ IIA—$\phi=(1+ay)$; $\phi'=a$; $n=1$:
- $f=Nf_a(1+ay)$ $t=t_a(1+ay)^{-1}$
- $2\Delta y=(2b/Na)(1+ay)$, which is linear with $y$ and $f$
- $W=(kV^2/N^3a)(1+ay)^3$, which is proportional to $f^3$
- $L_c=(kV/N^2a)(1+ay)^2$, which is proportional to $f^2$ IIB—$\phi=(1+ay)^{1/2}$; $\phi'=a/2$; $n=1/2$:
- $f=Nf_a(1+ay)^{1/2}$ $t=t_a(1+ay)^{-1/2}$:
- $2\Delta y=(4b/Na)(1+ay)$, which is linear with $y$ and proportional to $f^2$
- $W=(2kV^2/N^3a)(1+ay)^2$, which is proportional to $f^4$
- $L_c=(2kV/N^2a)(1+ay)^{3/2}$, which is proportional to $f^3$ IIC—$\phi=(1-ay)^{-1/2}$; $\phi'=-a/2$; $n=-1/2$;
- $f=Nf_a(1-ay)^{-1/2}$ $t=t_a(1-ay)^{1/2}$
- $2\Delta y=(4b/Na)(1-ay)$, which is linear with $y$ and proportional to $1/f^2$
- $W=(2kV^2/n^3a)$, which is independent of $y$ and $f$
- $L_c=(2kV/N^2a)(1-ay)^{1/2}$, which is proportional to $1/f$ IID—$\phi=(1-ay)^{-1}$; $\phi'=-a$; $n=-1$:
- $f=Nf_a(1-ay)^{-1}$ $t=t_a(1-ay)$, linear with $y$
- $2\Delta y=(2b/Na)(1-ay)$, which is linear with $y$ and proportional to $1/f$
- $W=(kV^2/N^3a)(1-ay)^{-1}$, which is proportional to $f$
- $L_c=(KV/N^2a)$, which is independent of $y$ and $f$ III—$\phi$=exponential function; $\phi=e^{ay}$; $\phi'=ae^{ay}$; $a>0$:
- $f=Nf_ae^{ay}$ $t=t_ae^{-ay}$
- $2\Delta y=(2b/Na)$, which is independent of $y$ and $f$
- $W=(kV^2/N^3a)e^{2ay}$, which is proportional to $f^2$
- $L_c=(KV/N^2a)e^{ay}$, which is proportional to $f$ Figs. 15, 16, 17, 18, and 19 are used to explain an occasionally observed extraneous, undesired effect in wedge radiators and to show several means for alleviating this condition.

Figure 15:
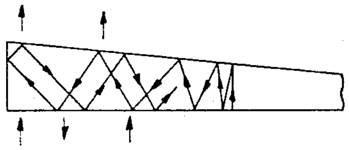

Fig. 15 shows how an internal wave in the wedge, which at the right side of the radiator is essentially normal to the radiator surfaces where it is generated, may upon multiple reflections in the wedge be propagated to the left-hand thick edge of the radiator. In some cases where the thick end of the wedge is terminated in an edge face which is essentially normal to the major wedge faces, the internal wave may be reflected back along paths which are parallel to the original path, and standing waves may be set up. When this condition occurs, there can be numerous narrow radiation regions shown by the arrows external to the radiator.

Figure 16:
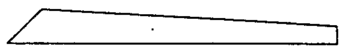

Fig. 16 shows a means of eliminating this extraneous standing wave effect by inclining the end face of the radiator at an angle substantially different from normal to the major faces.

Figure 17:
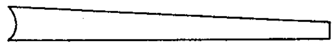
Figure 18:
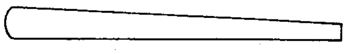

Figs. 17 and 18 show other means of eliminating the effect by making the thick end face curved: concave in Fig. 17 and convex in Fig. 18.

Figure 19:
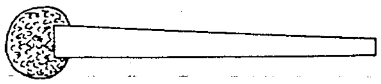

Fig. 19 shows another means of treating the end face for the same purpose by attaching thereto an absorbing impedance matching mass to prevent reflection at the thick end.

Fig. 20 shows a channel filter system in which a wedge radiator 40 is used on the input end, the wedge having a frequency range equal to three times the frequency separation of the channels. Three separate signal sources 41, 42, 43 may be connected to a single pair of conductors 44, travel over the same to a point where it is desired to reseparate the signals, and then be separated out to three separate terminations 45, 46, 47, each one receiving its own proper signal. At the end of the sonic unit opposite the wedge radiator are three piezoelectric pick-ups 48, 49, 50, each connected to one of the respective terminations 45, 46, 47. The sonic unit is designated by 51, and no optical unit is needed. The respective sound beams are indicated at 52, 53, and 54. The piezoelectric units 48, 49, 50 are preferably tapered and may be cut from a wedge radiator like radiator 40. The units 48, 49, 50 may also be replaced by a single receiver wedge with a single electrode exposed to the liquid and three insulated back electrodes, one connected to each of the terminations 45, 46, 47 in the proper order of thickness regions in the receiver wedge.

Fig. 21 shows another channel filter system operated like that described in Fig. 20, except that here the radiator is not in the form of a wedge, a different property of the radiator being used to obtain the same effect. As has been shown in my above-noted Patent No. 2,549,872, a curved radiator composed of piezoelectric crystal quartz may have a radiation region which varies in location in a manner similar to that here above described for a wedge. Fig. 34 of my above-noted Patent No. 2,549,872 is described as showing what thickness corrections would be required to obtain a constant resonant frequency over the whole radiator. However, if the radiator is made of uniform thickness, the figure shows equally well how the resonant frequency would vary from that at the center. Thus, if one makes a cylindrical shell radiator whose curvature is in the plane $\theta=+35°$, according to the description in my above-noted Patent No. 2,549,872, and whose effective curved dimension runs from $\alpha=0°$ (i. e., X-cut), at one end to $\alpha=30°$ (i. e., 30° off X-cut), at the other, the resonant frequency will vary from $f_0$ at the former end to 1.16 $f_0$ at the latter end. Thus, as the frequency of the voltage applied to the radiator varies from $f_0$ to 1.16 $f_0$, in fundamental operation, or from N$f_0$ to 1.16 $f_0$ in $n$th order harmonic operation, the radiation region moves along to the location where the radiator is in resonance with the applied frequency, thus acting just like previously-described wedge radiators. A radiator like Fig. 40 of my above-noted Patent No. 2,549,872, except that line D—D makes an angle of +35 degrees with Z—Z and the generatrix makes an angle of −55 degrees with Z—Z, may be used in the arrangement of Fig. 21 herein, only one half of the curved portion being needed, the half to either side of the line X—G—C—G—G, as shown at 208 in Fig. 28. The curved cross section of such a radiator 55 is shown connected to the signal sources 41, 42, 43. The pick-up may be plane or preferably curved to match. A curved tank 56 is shown with three receiving crystals 57, 58, 59 mounted opposite the excited regions of the radiator 55. The sound beams are indicated at 60, 61, 62.

Fig. 22 shows an ultrasonic delay line in which two wedge radiators are used, $R_1$ at the input end and an identical radiator at the output end, the internal major faces being parallel to each other. This use of wedge radiators instead of the more conventional constant-thickness radiators, as shown, for example, in United States Patent 2,407,294, September 10, 1946, permits the use of a wide frequency band without the necessity of using liquid mercury or a solid sound wave propagating medium, so that water may be used.

Fig. 23 shows application of a wedge radiator 63 to the measurement of the thickness $t$ of specimen 64 of a sheet material. As shown in the figure, it is assumed that the material is a metal and, therefore, electrically conducting. The wedge radiator with a single exterior electrode may be held against the sheet with a thin interlayer of water, oil, etc. The signal generator, shown at 65, may be equipped to supply a variable known frequency, controlled as by a variable condenser 66, and to have means for indicating the voltage and current supplied to the radiator, or voltage and current in the plate circuit of the last tube, a meter 67 being provided for such purpose. As is common practice, the frequency is varied until resonance in the test specimen is observed (as by a sharp rise of current to a maximum, or drop of voltage, or both). Two such conditions are shown schematically in the figure, one at $f_7$ for which there are $n=7$ one-half wavelengths of standing waves in the test specimen, and $f_8$ the next higher frequency for which $n=8$. However, before calculation, the values of $n$ are not known, only the values of $f_n$ and next higher adjacent frequency $f_{n+1}$. It is also assumed that from previous test, the sound velocity in the material is known to be $v$. Now, the wavelength in the material is given by $t=\frac{1}{2}n\lambda_n$ and by $f_n=v/\lambda_n$. Hence $f_n/n=f_{n+1}/(n+1)$, $n=f_n/(f_{n+1}-f_n)$, $t=\frac{1}{2}n\lambda_n=nv/2f_n$ or finally $$t=1v/2(f_{n+1}-f_n) \tag{32}$$

The advantage of using a wedge radiator is in giving a larger frequency range over which resonances may be obtained. For, if the plate is so thin that only a few half wavelengths may be obtained, only a wedge radiator will radiate effectively over a sufficiently wide frequency range. Further, even for thicker test plates where $n$ is large, the accuracy of locating the exact resonant frequency may be sufficiently small that $n=f_n/(f_{n+1}-f_n)$ is not determined to tell whether $n$ equals say 15 or 16. In this case, $t$ is determinable only within an accuracy of one-fifteenth or seven percent, whereas with the wedge radiator, it would be possible to go from $f_n$ to $f_{n+m}$, where $m=2, 3, 4, \ldots$, in which case $$t=mv/2(f_{n+m}-f_n) \tag{33}$$

where $m$ is the number of regions between resonances.

Fig. 24 shows another arrangement for measuring thickness of material where a wedge radiator 68 radiates into a liquid medium 69 in a tank 70 with windows parallel to the plane of the figure. The test material 71 is immersed in the tank, and an optical system like that of Fig. 1 (not shown) makes it possible to see when a sound beam is transmitted through the test material. In this case, as before, the frequency is varied from $f_n$ to $f_{n+m}$, each $m$ resonant frequency being determined by optical transmission beyond the specimen. The thickness calculation is determined as in the arrangement of Fig. 23.

In the cases of Figs. 23 and 24, it is possible to measure the thickness $t$ of a piece of material, the back side of which may not be accessible, for example, the wall of a closed tank, in Fig. 23, or of say a continuously moving sheet of material, as in Fig. 24, passing through packing 72 in the bottom of the tank. In either case, it is also feasible to measure instead the velocity in test specimens of known thickness, as, for example, in controlling the composition or processing of plastics.

In Figs. 25 and 26 is shown the application of the wedge radiator to a method of measuring velocity, which is described in my copending application, Serial No. 153,258, filed March 31, 1950, now United States Patent No. 2,723,556, issued November 15, 1955, and assigned to the assignee of the present application. The particular use of the method illustrated in Figs. 25 and 26 is for cases where the attenuation in the test material is large or where the resonance effects of the method of Fig. 24 are too indeterminate due to perfect impedance match, as is usually the case with plastics and polymers. In the present case, Figs. 25 and 26, the frequency is varied as before; and at specific frequencies, $f_n, f_{n+1} \ldots f_{n+m}$, the two sound beams A′ and B′ beyond the test block will be exactly out of phase and pass no light to the screen. When this occurs, according to the theory of my above-noted Patent No. 2,723,556.

$$\frac{1}{v_1}-\frac{1}{v_2}=\frac{1}{d\cdot f} \tag{34}$$

where $v_1$ is the known velocity in the liquid, $f$ is the frequency, and $d$ is the interference region spacing within the block, which, in the present case, cannot be observed due to opacity. However, there will be $(n+\delta)$ such bands in the distance $t$=thickness of the block at the frequency $f_n$ and $n+\delta+m$ bands at $f_{n+m}$. That is, $$d_n=\frac{t}{n+\delta}$$

and $$d_{n+m}=\frac{t}{n+\delta+m}$$

whence $$\frac{1}{v_1}-\frac{1}{v_2}=\frac{n+\delta}{t\cdot f_n}=\frac{n+\delta+m}{t\cdot f_{n+m}} \quad (35)$$

If there is no phase change at the block to liquid interfaces for the condition cited, exact interference beyond the block and minimum light transmission, then $\delta=\frac{1}{2}$. If there is phase change, or if one chose some other specific optical effect (say maximum light transmission), then $-1<\delta<1$, but its value is really of no concern. It is only necessary that the desired optical effect at $f_n$ be repeated $m$ times upon reaching the frequency $f_{n+m}$. Solving the above identity for $n+\delta$ gives $$(n+\delta)=\frac{m\cdot f_n}{(f_n-f_n)} \quad (36)$$

which, when substituted into Equation 35, gives $$\frac{1}{v_1}-\frac{1}{v_2}=\frac{m}{t\cdot(f_{n+m}-f_n)} \quad (37)$$

where it is assumed $v_1$ is known, $f_{n+m}$ and $f_n$ and $m$ are measured, and either $v_2$ or $t$ is known. Solving for $v_2$ or $t$, $$v_2=\frac{v_1}{1-\frac{mv_1}{t(f_{n+m}-f_n)}}$$

$$t=\frac{m}{\left(\frac{1}{v_1}-\frac{1}{v_2}\right)(f_{n+m}-f_n)} \quad (38)$$

Fig. 27 shows a broad frequency band light modulator employing two identical wedge radiators 81 and 82, preferably of the taper-function type IID, previously described. Both wedges are driven from the same signal source 83 at the same frequency $f$. The optical system is identical with that shown in Fig. 1 and with such variations as are described for Fig. 1, except that the lens 19 of Fig. 1 may be omitted or may be positioned so as to gather the light passing aperture 17 and focus it at any desired point or plane, say onto a photocell. It is clear that here the light passing through both sound beams will be acted upon as though the sound beams had coexisted, as described in my above-noted Patent No. 2,723,556. Twice during each cycle, the two sound beams will be everywhere in phase, and the whole field will transmit light; whereas, at intermediate times, twice during each cycle, the two beams will be everywhere out of phase and transmit zero light (assuming equal amplitudes of sound beams). Thus, the light passing through the system past aperture 17 of Fig. 1 will be modulated at the frequency $2f$. This same condition would occur if the radiators were flat and excited at, or very close to, the resonant frequency of the radiators. The advantage of the wedge radiators is that the signal frequency may be varied over the range of resonance of the wedges, as previously explained, thus giving a broad-band light modulator.

What is claimed is:

1. A piezoelectric vibrator having a variation of resonant frequency from point to point over an extended area of its surface, electrical exciting means coupled to and common to an extended portion of said vibrator including regions of unequal resonant frequency, and individual receiving channel means coupled respectively to a plurality of said portions of vibrator of unequal resonant frequency.

2. An arrangement according to claim 1, in which the individual receiving channel means comprise piezoelectric pick-up elements mounted in the paths of respective vibrational waves radiated from different portions of surface of the piezoelectric vibrator.

3. An arrangement according to claim 2, in which the piezoelectric vibrator and the piezoelectric pick-up elements are coupled by a medium affording an approximate impedance match with said piezoelectric vibrator and pick-up elements.

4. A multiplex communication system comprising a wedge of piezoelectric material, a pair of electrical contact means between which the wedge is mounted, each said means extending over substantially the whole adjacent vibratile surface of said wedge, a plurality of piezoelectric pick-up elements mounted opposite respective portions of said wedge of different thickness, said wedge and said pick-up elements being coupled by a medium of suitable transmission characteristics for vibrations of said piezoelectric devices, a plurality of signal sources of different frequencies electrically coupled to said electrical contact means on said wedge, and a plurality of frequency selective receiving channels electrically coupled respectively to said pick-up elements.

5. In a system for selectively exciting resonances in a multiply resonant elastic system, a piezoelectric radiator having a variation of resonant frequency from point to point over an extended area of its surface, electrical exciting means of variable frequency coupled to and common to an extended portion of said radiator including a plurality of regions of unequal resonant frequency to cause the radiation into an adjacent elastic medium of waves of frequency related to the frequency of the exciting means within the range of frequencies of said piezoelectric radiator, means to position the said multiply resonant elastic system in said medium in coupled relationship to said radiator, and means to detect the transmission of energy through said multiply resonant elastic system at any of the resonant frequencies thereof within the range of frequencies radiated by said radiator.

6. In combination, first and second multiply resonant elastic transmission systems of which systems at least the first in a piezoelectric device including discrete portions exhibiting different resonant frequencies, electrical exciting means of variable frequency coupled to said piezoelectric device to cause radiation into an adjacent elastic medium therefrom of waves of frequency determined by the frequency of the exciting means within the range of resonant frequencies of said piezoelectric device, said second multiply resonant system being positioned in the path of said radiation, and means coupled to said second multiply resonant system to detect the transmission of energy through said second multiply resonant system.

7. The combination according to claim 5 in which the piezoelectric radiator is in the form of a wedge.

8. The combination according to claim 5 together with means to measure the frequency of resonance in the specimen.

9. A radiator having a variation of resonant frequency from point to point over an extended area of its surface, comprising a piezoelectric quartz plate in the form of a circular cylindrical shell of uniform thickness, the generatrix of the cylindrical surface of which is parallel to a YZ-plane of the mother crystal and is perpendicular to a plane through an X-axis of the mother crystal which latter plane is inclined to the Z-axis by an angle of substantially 35 degrees in the direction of parallelism with a minor cap face.

(References on following page)

References Cited in the file of this patent

UNITED STATES PATENTS

| | | |
|---|---|---|
| 1,416,550 | Frank | May 16, 1922 |
| 1,548,260 | Espenschied | Aug. 4, 1925 |
| 2,084,201 | Karolus | June 15, 1937 |
| 2,185,693 | Mertz | Jan. 2, 1940 |
| 2,224,700 | Wolfskill | Dec. 10, 1940 |
| 2,308,360 | Fair | Jan. 12, 1943 |
| 2,418,964 | Arenberg | Apr. 15, 1947 |
| 2,423,459 | Mason | July 8, 1947 |
| 2,431,234 | Rassweiler et al. | Nov. 18, 1947 |
| 2,446,835 | Keary | Aug. 10, 1948 |
| 2,447,061 | Franklin | Aug. 17, 1948 |
| 2,455,389 | Soller | Dec. 7, 1948 |
| 2,461,543 | Gunn | Feb. 15, 1949 |
| 2,467,325 | Mason | Apr. 12, 1949 |
| 2,495,168 | Houghton | Jan. 17, 1950 |
| 2,496,295 | Langer | Feb. 7, 1950 |
| 2,505,515 | Arenberg | Apr. 25, 1950 |
| 2,540,505 | Bliss | Feb. 6, 1951 |
| 2,541,067 | Jaynes | Feb. 13, 1951 |

FOREIGN PATENTS

| | | |
|---|---|---|
| 954,574 | France | June 13, 1949 |

OTHER REFERENCES

Publication, Journal of Applied Physics, article by Barnes et al., March 1949, pages 286–294.